United States Patent
Gibson et al.

(10) Patent No.: US 11,581,810 B2
(45) Date of Patent: Feb. 14, 2023

(54) VOLTAGE REGULATION CIRCUIT

(71) Applicant: TEXAS INSTRUMENTS INCORPORATED, Dallas, TX (US)

(72) Inventors: Neil Gibson, Freising (DE); Stefan Herzer, Marzling (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/376,549

(22) Filed: Jul. 15, 2021

(65) Prior Publication Data

US 2021/0344272 A1 Nov. 4, 2021

Related U.S. Application Data

(62) Division of application No. 16/694,441, filed on Nov. 25, 2019, now Pat. No. 11,095,220.

(51) Int. Cl.
| | |
|---|---|
| H02M 3/158 | (2006.01) |
| H02M 1/00 | (2006.01) |
| H02M 3/156 | (2006.01) |

(52) U.S. Cl.
CPC ......... *H02M 3/158* (2013.01); *H02M 1/0035* (2021.05); *H02M 3/1566* (2021.05)

(58) Field of Classification Search
CPC ... H02M 1/0035; H02M 3/1566; H02M 3/158
See application file for complete search history.

(56) References Cited

U.S. PATENT DOCUMENTS

| | | | |
|---|---|---|---|
| 7,259,603 B2 | 8/2007 | Gibson et al. | |
| 2011/0148375 A1* | 6/2011 | Tsuji | H03F 1/0211 |
| | | | 330/297 |
| 2013/0249509 A1* | 9/2013 | Nakamoto | H02M 3/158 |
| | | | 323/271 |
| 2014/0375332 A1 | 12/2014 | Michal | |
| 2016/0099645 A1 | 4/2016 | Fujimura | |
| 2017/0229961 A1* | 8/2017 | Zhang | H02M 3/1584 |
| 2019/0058398 A1 | 2/2019 | Sharifi | |

* cited by examiner

*Primary Examiner* — Kyle J Moody
*Assistant Examiner* — Lakaisha Jackson
(74) *Attorney, Agent, or Firm* — Frank D. Cimino

(57) ABSTRACT

A voltage regulation circuit includes a switching output terminal, a high-side output transistor, a low-side output transistor, a high-side replica transistor, a low-side replica transistor, and a comparator circuit. The high-side output transistor is configured to drive the switching output terminal. The low-side output transistor is configured to drive the switching output terminal. The high-side replica transistor is coupled to the high-side output transistor. The low-side replica transistor is coupled to the high-side replica transistor and the low-side output transistor. The comparator circuit is coupled to the high-side replica transistor and the low-side replica transistor, and is configured to compare a signal received from both the high-side replica transistor and the low-side replica transistor to a ramp signal.

15 Claims, 10 Drawing Sheets

VOLTAGE REGULATION CIRCUIT

This application is a divisional of prior application Ser. No. 16/694,441, filed Nov. 25, 2019, currently pending.

BACKGROUND

A switch-mode power supply is an electronic circuit that converts an input direct current (DC) supply voltage into one or more DC output voltages that are higher or lower in magnitude than the input DC supply voltage. A switch-mode power supply that generates an output voltage lower than the input voltage is termed a buck or step-down converter. A switch-mode power supply that generates an output voltage higher than the input voltage is termed a boost or step-up converter.

Switch-mode power supplies include a feedback loop to control regulation of output voltage. The feedback loop nay control regulation based on power supply output voltage, inductor current, and/or other power supply parameters. Voltage mode control compares the output voltage to a reference voltage and determines an error voltage. The error voltage is compared to a triangle wave to set the pulse width controlling the power supply's output transistors.

SUMMARY

A switch-mode power supply that applies voltage mode control is disclosed herein. The voltage mode control circuitry provides discontinuous mode operation, a wide compensation range, and fast settling. In one example, a voltage regulation circuit includes a first transistor, a second transistor, a third transistor, a fourth transistor, a switching output terminal, a comparator circuit, a compensation circuit. The switching output terminal is coupled to a first terminal of the first transistor and a first terminal of the second transistor. The comparator circuit includes an output terminal coupled to a second terminal of the first transistor and a second terminal of the second transistor. The third transistor includes a first terminal coupled to the second terminal of the first transistor. The fourth transistor includes a first terminal coupled to the second terminal of the second transistor, and a second terminal coupled to a second terminal of the third transistor, a first input terminal of the comparator circuit, and a second input terminal of the comparator circuit. The compensation is circuit configured to provide error signals to third and fourth input terminals of the comparator circuit.

In another example, a voltage regulation circuit includes a switching output terminal, a high-side output transistor, a low-side output transistor, a high-side replica transistor, a low-side replica transistor, and a comparator circuit. The high-side output transistor is configured to drive the switching output terminal. The low-side output transistor is configured to drive the switching output terminal. The high-side replica transistor is coupled to the high-side output transistor. The low-side replica transistor is coupled to the high-side replica transistor and the low-side output transistor. The comparator circuit is coupled to the high-side replica transistor and the low-side replica transistor, and is configured to compare a signal received from both the high-side replica transistor and the low-side replica transistor to a ramp signal.

In a further example, a switch-mode power supply includes a switching output terminal, a first transistor, a second transistor, a third transistor, a fourth transistor, a comparator circuit, and a compensation circuit. The first transistor includes a first terminal coupled to the switching output terminal. The second transistor includes a first terminal coupled to the switching output terminal. The comparator circuit includes an output terminal coupled to a second terminal of the first transistor and a second terminal of the second transistor. The third transistor includes a first terminal coupled to the second terminal of the first transistor. The fourth transistor includes a first terminal coupled to the second terminal of the second transistor, and a second terminal coupled to a second terminal of the third transistor, a first input terminal of the comparator circuit, and a second input terminal of the comparator circuit. The compensation circuit includes a first input terminal coupled to an output of a voltage divider circuit, a second input terminal coupled to a reference voltage source, a first output terminal coupled to third input terminal of the comparator circuit, and a second output terminal coupled to a fourth input terminal of the comparator circuit.

BRIEF DESCRIPTION OF THE DRAWINGS

For a detailed description of various examples, reference will now be made to the accompanying drawings in which.

DETAILED DESCRIPTION

Figure 1:
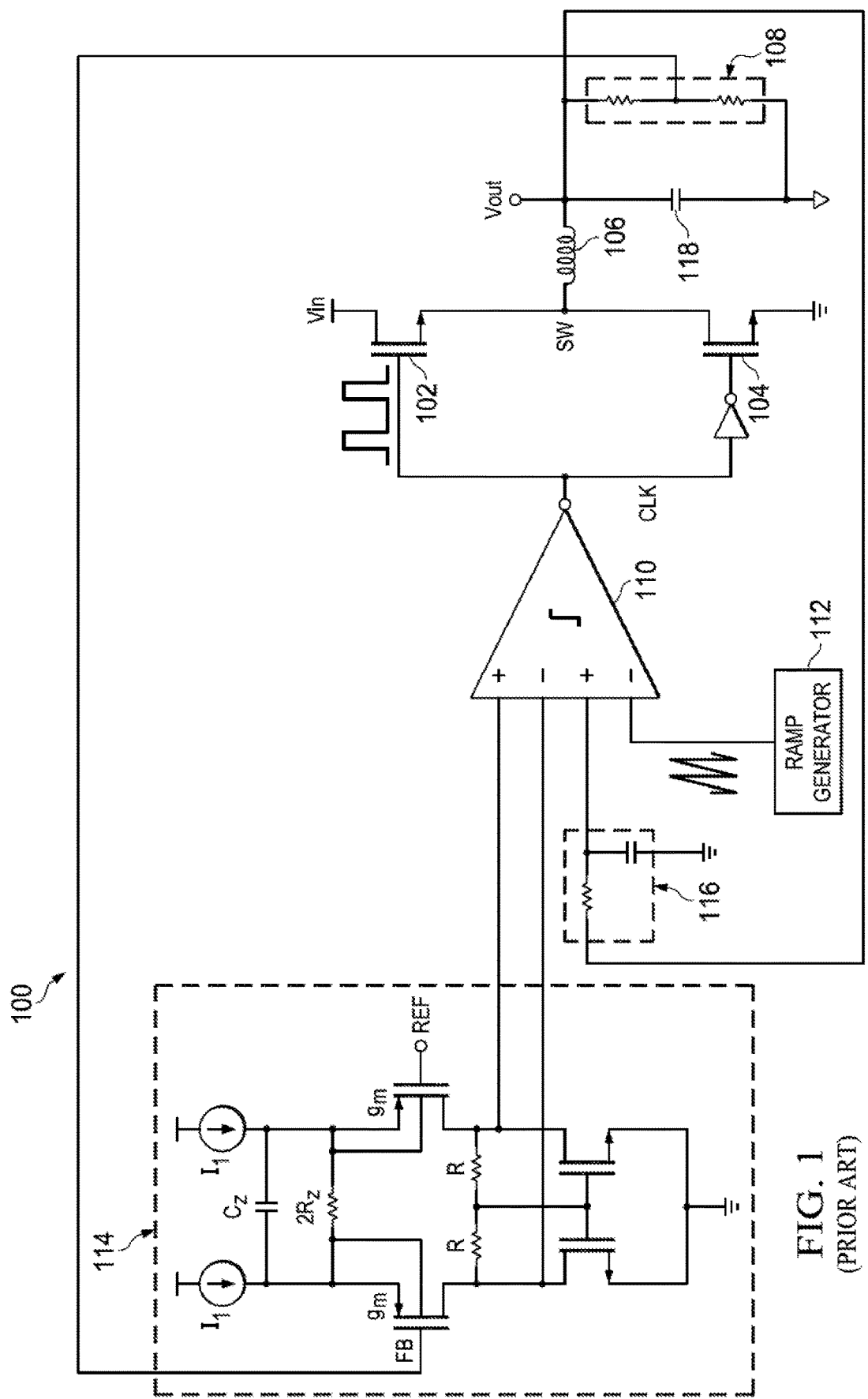
FIG. 1 shows a schematic diagram for an example fixed-frequency voltage mode regulation circuit.

Voltage regulation circuits, such as switch-mode power supplies, that employ voltage mode control apply only voltage in the feedback loop may be relatively simple compared to current mode control and can provide both fixed frequency and high bandwidth operation. However, such circuits may be difficult to stabilize without excessive current use, and implementation of discontinuous mode operation may be complex. FIG. 1 shows a schematic diagram for an example fixed-frequency voltage mode regulation circuit 100. The fixed-frequency voltage mode regulation circuit 100 is a step-down converter. The fixed-frequency voltage mode regulation circuit 100 includes a high-side output transistor 102, a low-side output transistor 104, an inductor 106, a voltage divider 108, a comparator circuit 110, a ramp generation circuit 112, a compensation circuit 114, and a low-pass filter circuit 116.

The high-side output transistor 102 and the low-side output transistor 104 are coupled the inductor 106. Current flows through the high-side output transistor 102 to charge the inductor 106, and the low-side output transistor 104 connects the inductor 106 to ground to discharge the inductor 106. The high-side output transistor 102 and the low-side output transistor 104 are coupled to the comparator circuit 110 and switched on and off in complementary fashion by output signal generated by the comparator circuit 110. The comparator circuit 110 is a summing comparator that produces an output based a sum of the differential inputs (e.g., produce a logic "high" output based on a sum of the "+" inputs being greater than a sum of the "−" inputs).

An input of the comparator circuit 110 is coupled to the inductor 106 via a low-pass filter circuit 116 for reception of a feedback voltage from the inductor 106. The voltage output of the low-pass filter circuit 116 is proportional to the voltage output of the inductor 106 (Vout). The ramp generation circuit 112 is coupled to another input of the comparator circuit 110. The ramp generation circuit 112 generates a ramp signal for comparison, by the comparator circuit 110, to the feedback voltage received via the low-pass filter circuit 116. The voltage of the ramp signal is proportional to voltage (Vin) on the power supply rail coupled to the high-side output transistor 102.

Figure 2:
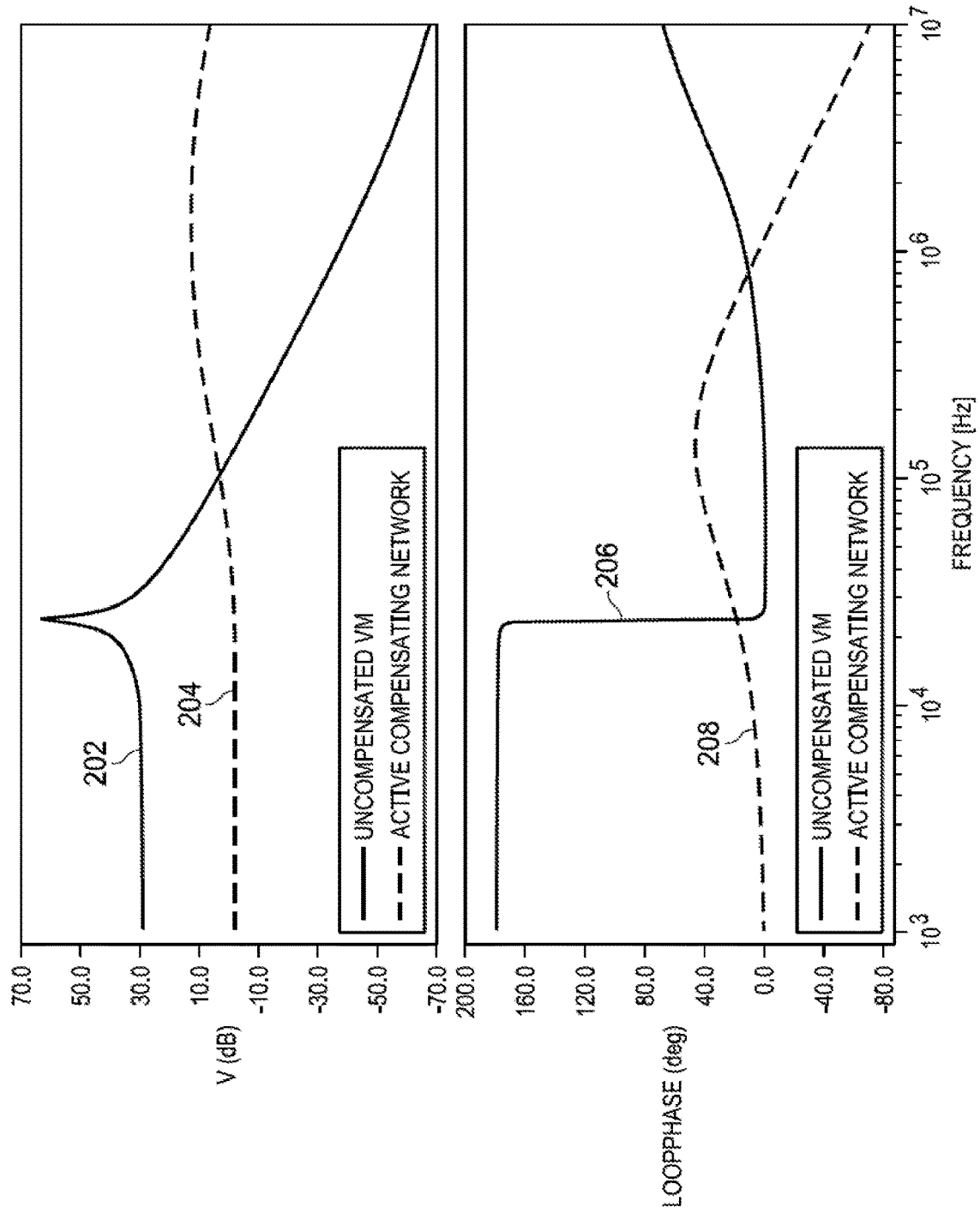
FIG. 2 shows loop gain and phase in the fixed-frequency voltage mode regulation circuit of FIG. 1.

The voltage divider 108 is coupled to the inductor 106 to divide the voltage at the output of the inductor 106 as determined by the resistors of the voltage divider 108. The voltage divider 108 is coupled to the compensation circuit 114. The compensation circuit 114 boosts phase, and compensates the loop formed by the comparator circuit 110, the high-side output transistor 102, the low-side output transistor 104, the inductor 106, the voltage divider 108 and the compensation circuit 114. A gain boost associated with the boost in phase contributes to fast transient response. FIG. 2 shows loop gain and phase in the fixed-frequency voltage mode regulation circuit 100. Gain in the fixed-frequency voltage mode regulation circuit 100 without compensation is shown as 202 and gain with compensation by the compensation circuit 114 is shown as 204. Phase in the fixed-frequency voltage mode regulation circuit 100 is shown as 206, and phase with compensation by the compensation circuit 114 is shown as 208. While the compensation circuit 114 provides an improvement in the phase performance of the fixed-frequency voltage mode regulation circuit 100, obtaining a greater phase boost in the compensation circuit 114 requires higher quiescent current, which is undesirable. As a result of the limited phase boost provided by the compensation circuit 114, the range of inductance and capacitance values suitable for use in the inductor 106 and the output capacitor 118 is undesirably limited. For example, smaller values of inductance and capacitance are desirable to reduce power supply size and cost.

The DC resistance of the inductor 106 produces a load dependent voltage drop at the output of the fixed-frequency voltage mode regulation circuit 100. The voltage drop may be expressed as:

$$OutputVoltageDrop = \frac{DCResistance * LoadCurrent}{ModulatorGain}$$

Figure 3:
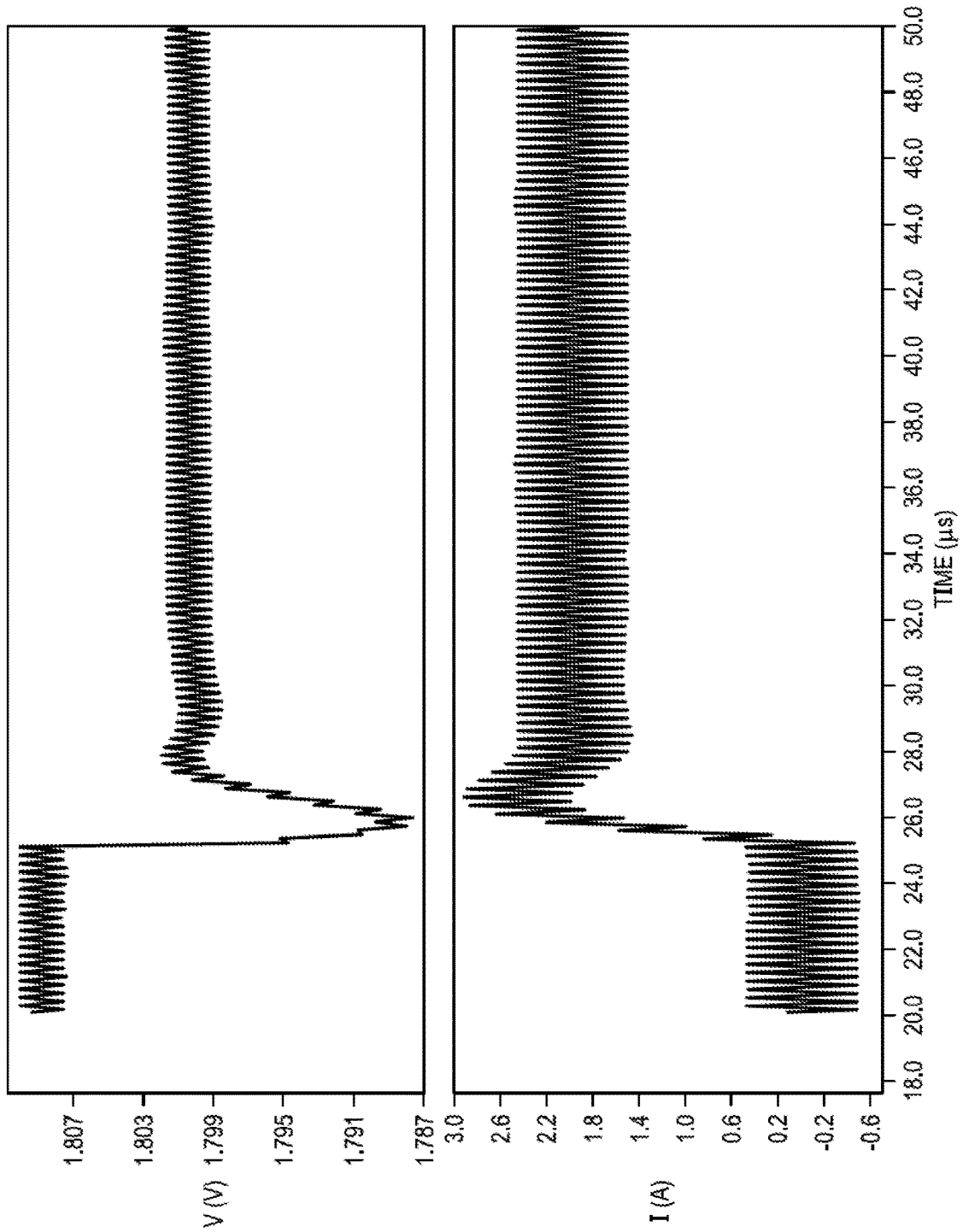
FIG. 3 shows output voltage response in the fixed-frequency voltage mode regulation circuit of FIG. 1.

The load dependent voltage drop is brought back into regulation by the low-pass filter circuit 116, which has an associated recovery time. A large range of output inductance and capacitance aggravates regulation of the voltage drop. FIG. 3 shows output voltage response in the fixed-frequency voltage mode regulation circuit 100. FIG. 3 shows about a 7 millivolt drop in output voltage with a 2 ampere load current. In this example, the DC resistance of the inductor 106 is 50 milliohms, gain from ramp signal is 10, and gain from the comparator circuit 110 is 1.5.

$$\frac{0.05 * 2}{15 * 10} \approx 7 \text{ mV}$$

Figure 4:
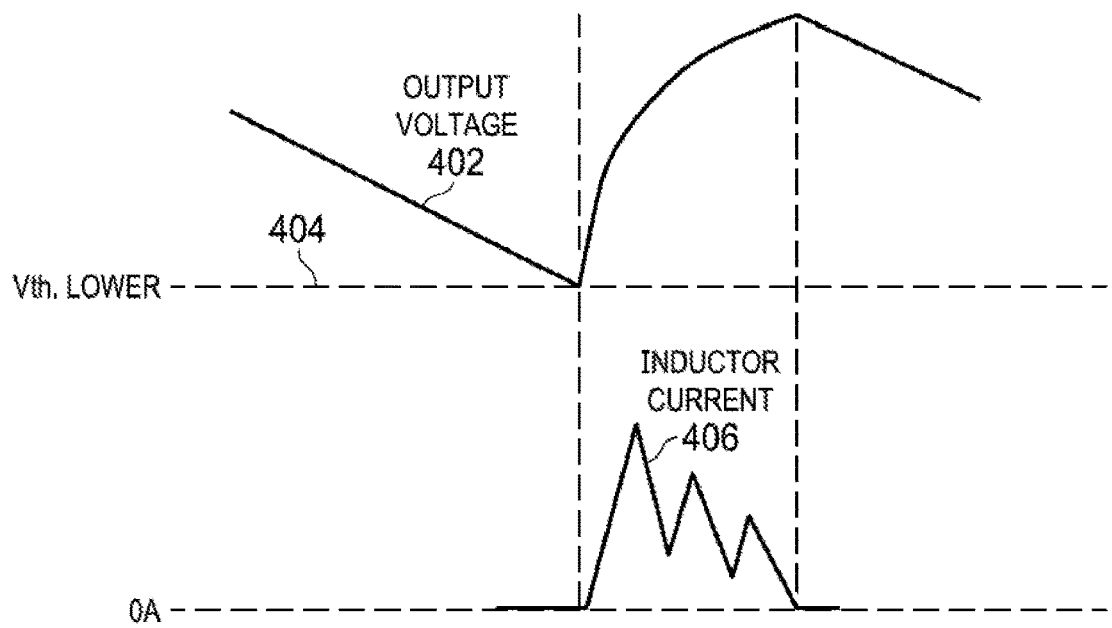
FIGS. 4-6 show examples of discontinuous mode operation suitable for use with the fixed-frequency voltage mode regulation circuit of FIG. 1.
Figure 5:
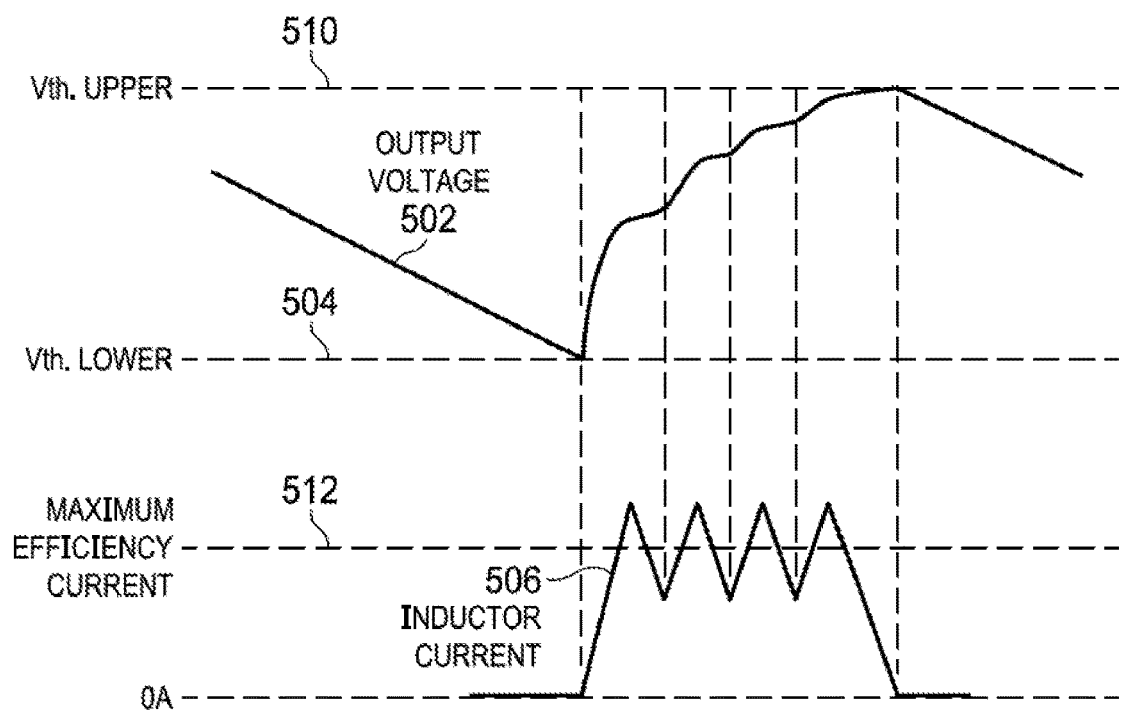
Figure 6:
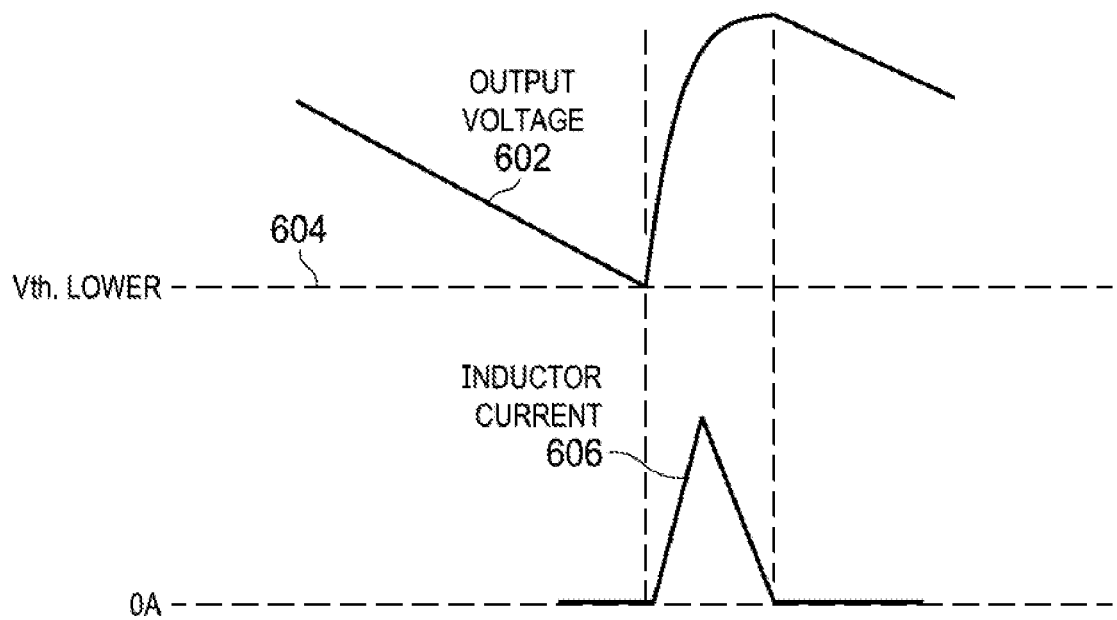

The implementation of the fixed-frequency voltage mode regulation circuit 100 shown in FIG. 1 does not support discontinuous mode operation. FIGS. 4-6 show examples of discontinuous mode operation suitable for use with various implementations of the fixed-frequency voltage mode regulation circuit 100. FIG. 4 shows inductor current 406 and power supply output voltage 402 for operational burst discontinuous mode. Reversal of inductor current flow is detected, and the low-side output transistor is turned off. When the power supply output voltage 402 falls below the lower threshold 404, the controller generates a burst of pulses until the inductor current returns to zero. Disadvantages of this mode include: generation of multiple pulses, indeterminate output voltage ripple, and indeterminate hysteresis between discontinuous and continuous mode.

FIG. 5 shows inductor current 506 and power supply output voltage 502 for peak efficiency burst mode operation. When the power supply output voltage 502 falls below the lower threshold 504, the controller generates a burst of pulses producing an average current in the inductor corresponding to a maximum efficiency current 512. The output voltage rises, and the burst continues until the output voltage reaches the upper threshold 510. Disadvantages of this mode include: generation of multiple pulses, indeterminate output voltage ripple, circuit complexity, and boundary conduction glitches.

FIG. 6 shows inductor current 606 and power supply output voltage 602 for a single pulse burst mode operation. This discontinuous mode operation is normally associated with 'constant-on-time' controllers. When the power supply output voltage 602 falls below the lower threshold 604, the controller generates a single pulse. The width of the pulse may be controlled by a monostable multivibrator. The output voltage rises, and the sequence terminates when the inductor current returns to zero. Disadvantages of this mode include generation of multiple pulses for high power supply output capacitance.

Figure 7A:
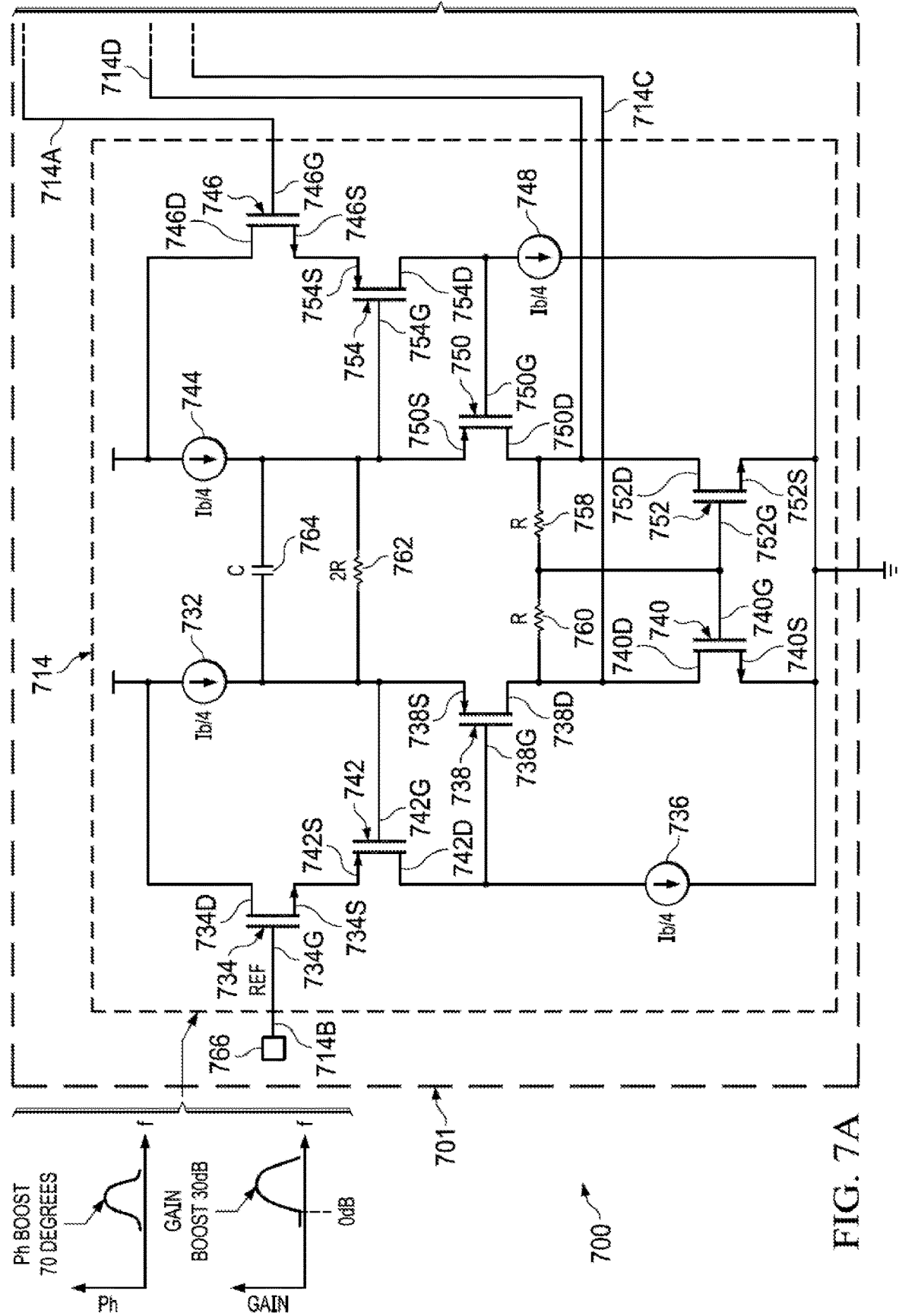
FIGS. 7A and 7B shows a schematic diagram for an example fixed-frequency enhanced voltage mode regulation circuit.
Figure 7B:
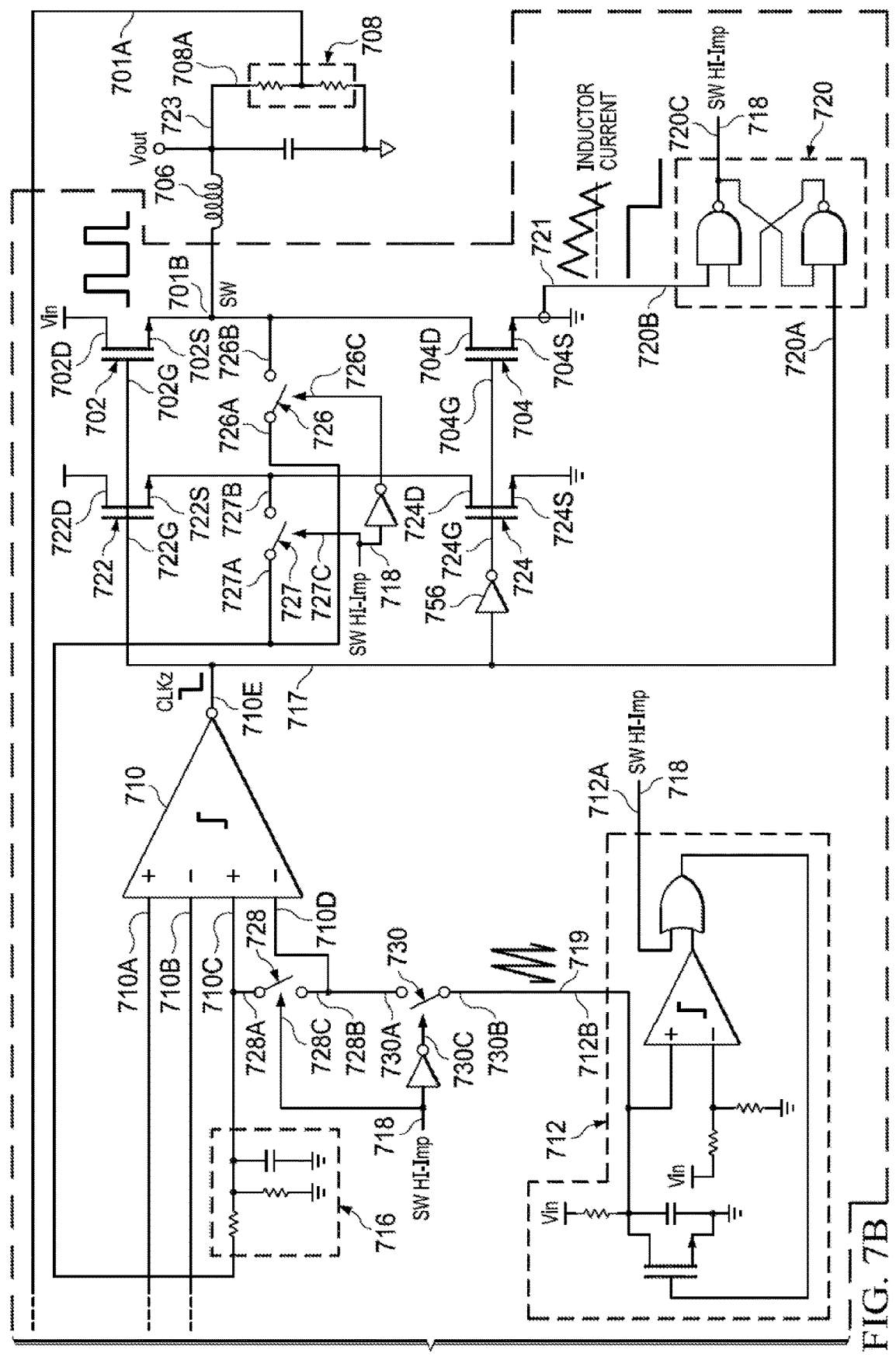

FIGS. 7A and 7B shows a schematic diagram for an example fixed-frequency enhanced voltage mode regulation circuit 700. The fixed-frequency enhanced voltage mode regulation circuit 700 is a step-down converter. The fixed-frequency enhanced voltage mode regulation circuit 700 includes an enhanced voltage mode regulation control circuit 701, an inductor 706, and a voltage divider 708. The enhanced voltage mode regulation control circuit 701 includes a feedback terminal 701A, a switching output terminal 701B, a high-side output transistor 702, a low-side output transistor 704, a high-side replica transistor 722, a low-side replica transistor 724, a comparator circuit 710, a ramp generation circuit 712, a low-pass filter circuit 716, a latch circuit 720, a switch 726, a switch 727, a switch 728, and a switch 730.

The high-side output transistor 702 and the low-side output transistor 704 are coupled to, and drive, the switching output terminal 701B and the inductor 706. Current flows through the high-side output transistor 702 to charge the inductor 706, and the low-side output transistor 704 connects the inductor 706 to ground to discharge the inductor 706. The high-side output transistor 702 and the low-side output transistor 704 are coupled to the comparator circuit 710 and switched on and off in complementary fashion by signal 717 generated by the comparator circuit 710. The comparator circuit 710 is a summing comparator that produces an output based a sum of the differential inputs (e.g., produce a logic "high" output based on a sum of the "+" inputs being greater than a sum of the "−" inputs).

The high-side output transistor 702 includes a drain terminal 702D coupled to a power supply rail, a source terminal 702S coupled to the inductor 706, and a gate terminal 702G coupled to the output terminal 710E of the comparator circuit 710. The low-side output transistor 704 includes a drain terminal 704D coupled to the source terminal 702S of the high-side output transistor 702 and the inductor 706, a source terminal 704S coupled to ground, and a gate terminal 704G coupled to the output terminal 710E of the comparator circuit 710 via an inverter 756.

The high-side replica transistor 722 and the low-side replica transistor 724 are coupled to the output terminal 710E of the comparator circuit 710 in parallel with the high-side output transistor 702 and the low-side output transistor 704. The high-side replica transistor 722 includes a drain terminal 722D coupled to the drain terminal 702D of the high-side output transistor 702, a source terminal 722S coupled to the drain terminal 724D of the low-side replica transistor 724, and a gate terminal 722G coupled to the gate terminal 702G of the high-side output transistor 702 for common control. The low-side replica transistor 724 includes a drain terminal 724D coupled to the source terminal 722S of the high-side replica transistor 722 (to provide a push-pull output replicating the switching output terminal 701B), a source terminal 724S coupled to ground, and a gate terminal 724G coupled to the gate terminal 704G of the low-side output transistor 704 for common control.

Figure 8:
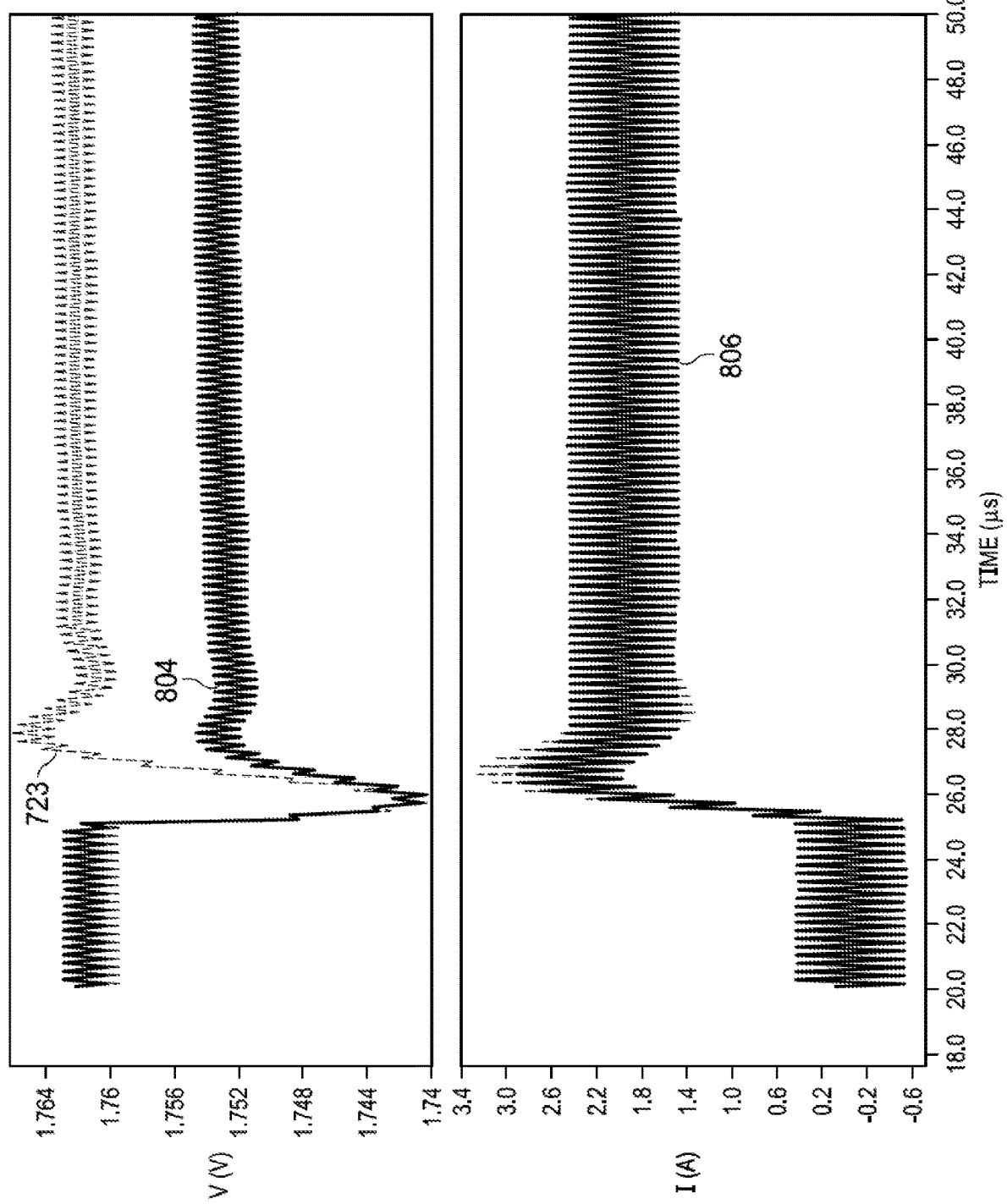
FIG. 8 shows output voltage response in the fixed-frequency enhanced voltage mode regulation circuit of FIGS. 7A and 7B.

An input terminal 710C of the comparator circuit 710 is coupled to the source terminal 722S of the high-side replica transistor 722 and the drain terminal 724D of the low-side replica transistor 724 via the switch 727 and the low-pass filter circuit 716 for reception of a feedback voltage from the high-side replica transistor 722 and the low-side replica transistor 724. Similarly, the input terminal 710C of the comparator circuit 710 is coupled to the source terminal 702S of the high-side output transistor 702 and the drain terminal 704D of the low-side output transistor 704 via the switch 726 and the low-pass filter circuit 716 for reception of a feedback voltage from the high-side output transistor 702 and the low-side output transistor 704. The voltage output of the low-pass filter circuit 716 is proportional to Vout+Iout*Rout, where Vout is the voltage output of the fixed-frequency enhanced voltage mode regulation circuit 700, Iout is current flowing to a load circuit, and Rout is the output resistance of the fixed-frequency enhanced voltage mode regulation circuit 700 (e.g., the DC resistance of the inductor 706). Thus, the high-side replica transistor 722 and the low-side replica transistor 724 produce a voltage at the input terminal 710C of the comparator circuit 710 that includes the voltage dropped across the output of the fixed-frequency enhanced voltage mode regulation circuit 700 which allows the fixed-frequency enhanced voltage mode regulation circuit 700 to compensate for the output voltage drop. FIG. 8 shows output voltage response in the fixed-frequency enhanced voltage mode regulation circuit 700 compared to response of the fixed-frequency voltage mode regulation circuit 100. With a 2 ampere load current 806, the output voltage 723 of the fixed-frequency enhanced voltage mode regulation circuit 700 does not exhibit the 7 millivolt drop in output voltage 804 produced by the fixed-frequency voltage mode regulation circuit 100.

The input terminal 710C of the comparator circuit 710 is coupled to the input terminal 710D of the comparator circuit 710 via the switch 728. The switch 728 includes a terminal 728A coupled to the input terminal 710C of the comparator circuit 710, a terminal 728B coupled to the input terminal 710D of the comparator circuit 710, and a terminal 728C coupled to the output terminal 720C of the latch circuit 720. The latch circuit 720 includes an input terminal 720A coupled to the output terminal 710E of the comparator circuit 710 and an input terminal 720B coupled to the source terminal 704S of the low-side output transistor 704. When the inductor 706 is discharged, and direction of current flow in the low-side output transistor 704 changes, the signal 718 output by the latch circuit 720 is activated to indicate that the fixed-frequency enhanced voltage mode regulation circuit 700 is driving a high-impedance load, and the fixed-frequency enhanced voltage mode regulation circuit 700 may operate in discontinuous mode. The switch 728 is closed when the signal 718 is active.

The drain terminal 704D of the low-side output transistor 704 is coupled to the low-pass filter circuit 716 via the switch 726. The switch 726 includes a terminal 726A coupled to low-pass filter circuit 716, a terminal 726B coupled to the source terminal 702S of the high-side output transistor 702, and a terminal 726C coupled to the output terminal 720C of the latch circuit 720 via an inverter. The switch 726 is closed when the signal 718 is inactive to provide feedback from the output transistors to the comparator 710 when the regulation circuit 700 is not driving a high-impedance load. The drain terminal 724D of the low-side replica transistor 724 is coupled to the low-pass filter circuit 716 via the switch 727. The switch 727 includes a terminal 727A coupled to the low-pass filter circuit 716, a terminal 727B coupled to the source terminal 722S of the high-side replica transistor 722, and a terminal 727C coupled to the output terminal 720C of the latch circuit 720. The switch 727 is closed when the signal 718 is active to provide feedback from the replica transistors to the comparator 710 when the regulation circuit 700 is driving a high-impedance load.

The ramp generation circuit 712 is coupled to the input terminal 710D of the comparator circuit 710 via the switch 730. The switch 730 includes a terminal 730A coupled to the input terminal 710D of the comparator circuit 710, a terminal 730B coupled to the output terminal 712B of the ramp generation circuit 712, and a terminal 730C coupled to the output terminal 720C of the latch circuit 720. The switch 730 is open when the signal 718 is active. The ramp generation circuit 712 generates a sawtooth ramp signal 719 with amplitude proportional to the voltage on the power supply rail. The ramp generation circuit 712 includes an input terminal 712A that is coupled to the output terminal 720C of the latch circuit 720. The ramp generation circuit 712 is disabled when the signal 718 is active. The ramp generation circuit 712 generates a sawtooth ramp signal 719 for comparison, by the comparator circuit 710, to the feedback voltage received via the low-pass filter circuit 716. The voltage of the sawtooth ramp signal 719 is proportional to voltage (Vin) on the power supply rail coupled to the high-side output transistor 702.

When the fixed-frequency enhanced voltage mode regulation circuit 700 is operating in continuous conduction mode, the ramp generation circuit 712 is enabled to generate the sawtooth ramp signal 719, the switch 728 is open, and the switch 730 is closed to allow the comparator circuit 710 to compare the feedback signal provided by the high-side replica transistor 722 and the low-side replica transistor 724 to the sawtooth ramp signal 719. When the fixed-frequency enhanced voltage mode regulation circuit 700 is operating in discontinuous mode, the ramp generation circuit 712 is disabled, the switch 728 is closed and the switch 730 is open to route the feedback signal provided by the high-side replica transistor 722 and the low-side replica transistor 724 to both input terminal 710C and input terminal 710D of the comparator circuit 710.

Figure 9:
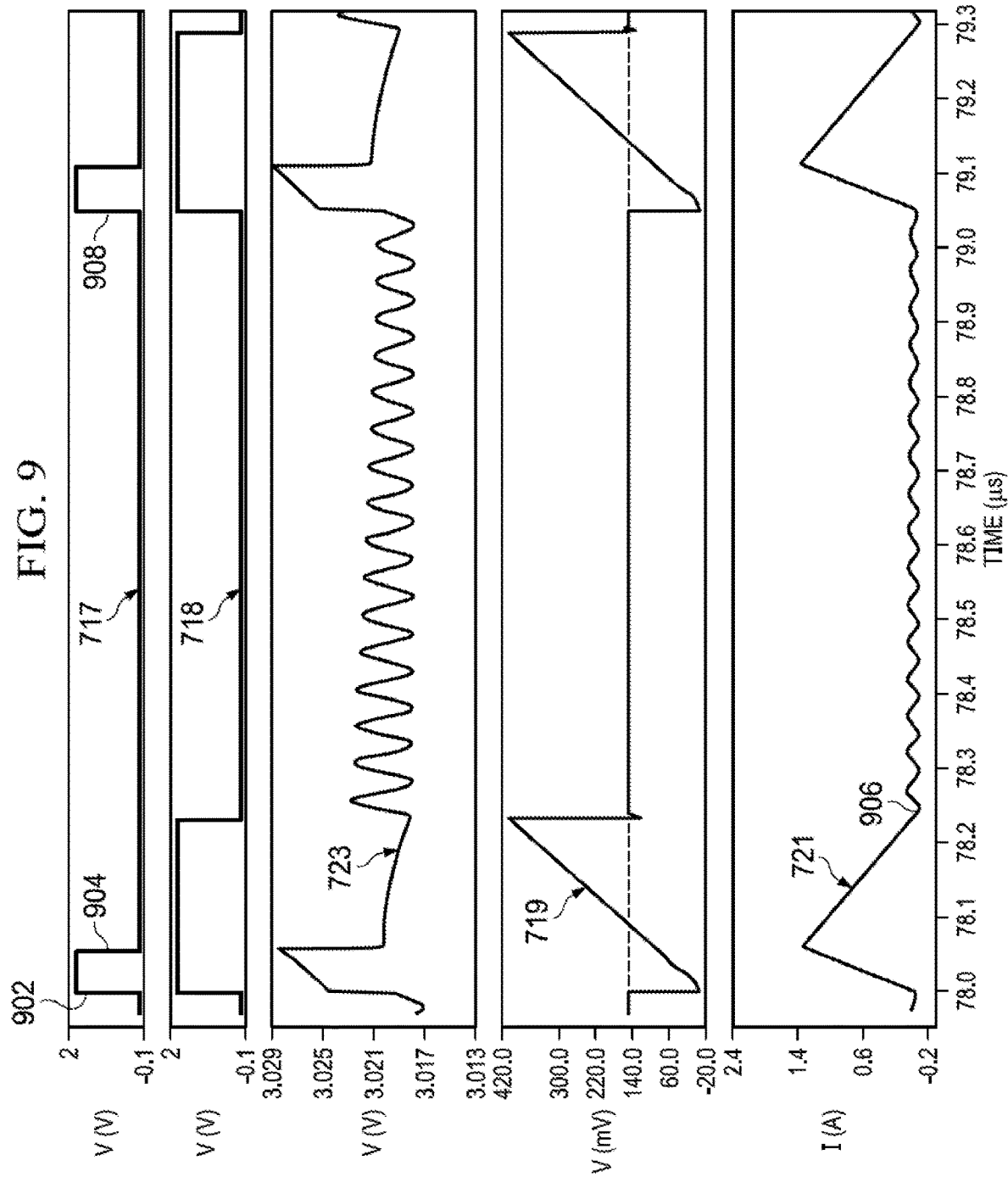
FIG. 9 shows signals in the fixed-frequency enhanced voltage mode regulation circuit of FIGS. 7A and 7B for discontinuous mode operation.

FIG. 9 shows signals generated in fixed-frequency enhanced voltage mode regulation circuit 700 for discontinuous mode operation. At 902 the comparator circuit 710 activates the signal 717 to charge the inductor 706, the latch circuit 720 is reset, and the signal 718 is deactivated. While the signal 718 is inactive, the ramp generation circuit 712 generates the sawtooth ramp signal 719. At 904, the signal 717 is deactivated and the inductor 706 discharges. At 906, the inductor 706 is discharged, the direction of current flow reverses, and the latch circuit 720 is set to activate the signal 718. Activation of the signal 718 disables the ramp generation circuit 712 and disconnects the ramp generation circuit 712 from the comparator circuit 710. The output voltage 723 falls over time, and at 908 the comparator circuit 710 activates the signal 717 to recharge the inductor 706. The sequence illustrated in FIG. 9 is repeated to provide discontinuous mode operation while the load powered by the fixed-frequency enhanced voltage mode regulation circuit 700 presents a high-impedance.

The compensation circuit 714 boosts both phase and gain of voltage feedback relative to the compensation circuit 114 without increasing quiescent current consumption, which increases the range of inductance and capacitance values suitable for the inductor 706 and the signal 718. The compensation circuit 714 includes an input terminal 714A coupled to an output 708B of the voltage divider 708, and an input terminal 714B coupled to a reference voltage source 766. The reference voltage source 766 generates a reference voltage that the compensation circuit compares to the feedback signal provided by the voltage divider 708 to generate an error signal. The compensation circuit 714 also includes an output terminal 714C coupled to an input terminal 710A of the comparator circuit 710, and an output terminal 714D coupled to an input terminal 710B of the comparator circuit 710.

An implementation of the compensation circuit 714 includes a current source 732, a transistor 734, current source 736, a transistor 738, a transistor 740, a transistor 742, a current source 744, a transistor 746, current source 748, a transistor 750, a transistor 752, and a transistor 754. The transistor 750 includes a gate terminal 750G coupled to the current source 748 and a drain terminal 750D coupled to the output terminal 714D. The transistor 752 includes a drain terminal 752D coupled to the drain terminal 750D of the transistor 750, a source terminal 752S coupled to ground, and a gate terminal 752G coupled to drain terminal 752D of the transistor 752 via a resistor 758. The transistor 746 includes a gate terminal 746G coupled to the input terminal 714A, and a drain terminal 746D coupled to the power supply rail and the current source 744. The transistor 754 includes a source terminal 754S coupled to a source terminal 746S of the transistor 746, a drain terminal 754D coupled to the gate terminal 750G of the transistor 750, and a gate terminal 754G coupled to the source terminal 750S of the transistor 750, the current source 744, a capacitor 764, and a resistor 762.

The transistor 738 includes a gate terminal 738G coupled to the current source 736 and a drain terminal 738D coupled to the output terminal 714C. The transistor 740 includes a drain terminal 740D coupled to the drain terminal 738D of the transistor 738, a source terminal 740S coupled to ground, and a gate terminal 740G coupled to drain terminal 740D of the transistor 740 via a resistor 760. The transistor 734 includes a gate terminal 734G coupled to the input terminal 714B, a drain terminal 734D coupled to the power supply rail and the current source 732. The transistor 742 includes a source terminal 742S coupled to a source terminal 734S of the transistor 734, a drain terminal 742D coupled to the gate terminal 738G of the transistor 738, and a gate terminal 742G coupled to the source terminal 738S of the transistor 738, the current source 732, the capacitor 764, and the resistor 762. The networks including transistors 734, 742, and 738, and transistors 746, 754, and 750 are examples of transconductance boosting circuits of the transistors 738 and 750 suitable for use in the compensation circuit 714. A variety of other transconductance boosting circuits may be employed in the compensation circuit 714.

Figure 10:
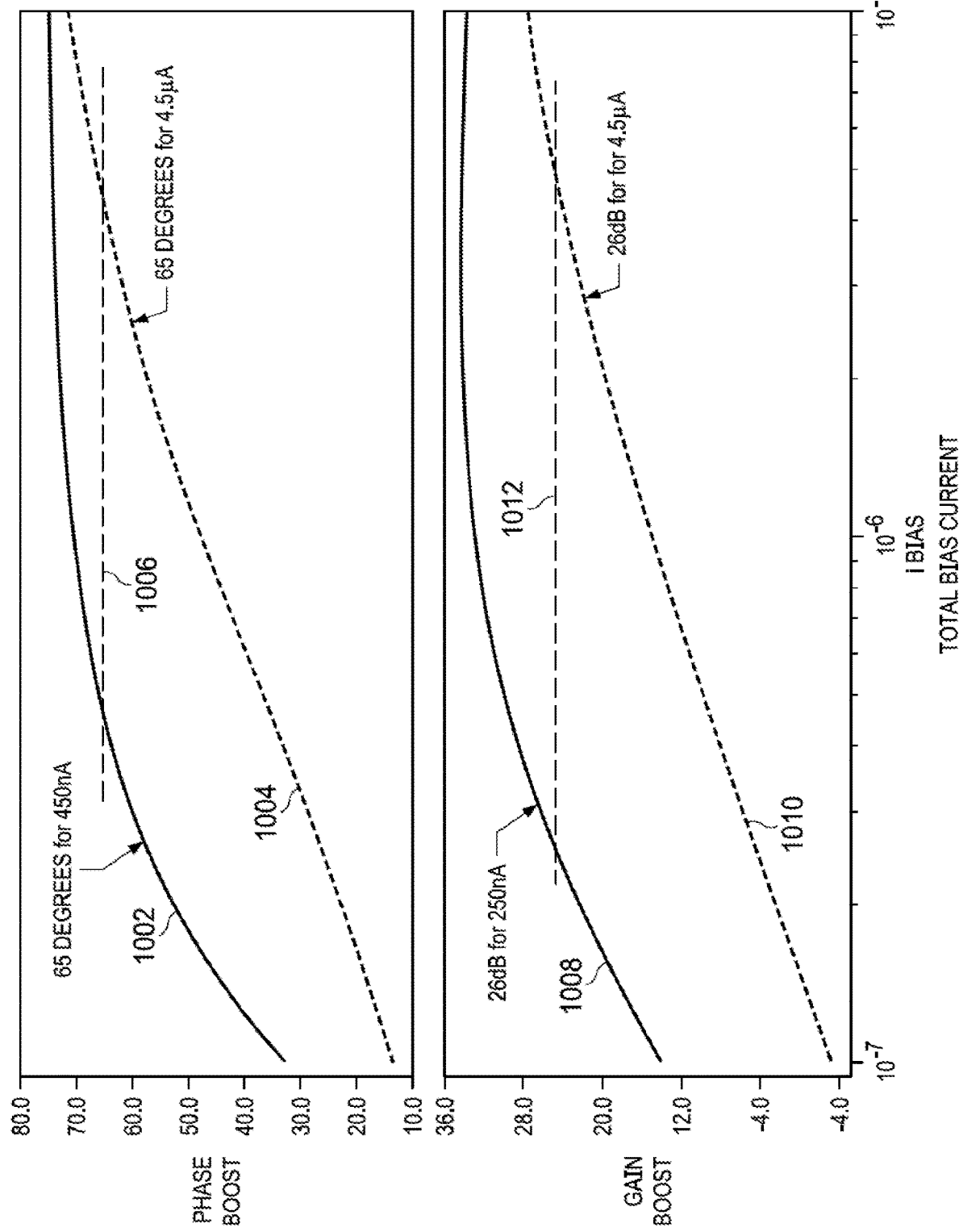
FIG. 10 shows loop gain and phase in the fixed-frequency enhanced voltage mode regulation circuit of FIGS. 7A and 7B.

FIG. 10 shows loop gain and phase in the fixed-frequency enhanced voltage mode regulation circuit 700 and gain and phase boost in the fixed-frequency voltage mode regulation circuit 100 versus current. More specifically, FIG. 10 shows that the fixed-frequency enhanced voltage mode regulation circuit 700 provides about 65 degrees of phase boost with about 450 nanoamperes of current, while the fixed-frequency voltage mode regulation circuit 100 uses about 4.5 microamperes of current to provide about 65 degrees of phase boost. The quoted of current consumption figures are process dependent and are provided for comparative purposes. Similarly, the fixed-frequency enhanced voltage mode regulation circuit 700 provides about 26 decibels of gain boost with about 250 nanoamperes of current, while the fixed-frequency voltage mode regulation circuit 100 uses about 4.5 microamperes of current to provide about 26 decibels of gain boost. Thus, the fixed-frequency enhanced voltage mode regulation circuit 700 provides increased phase and gain boost that expands the range of output inductance and capacitance without increasing current consumption.

Figure 11:
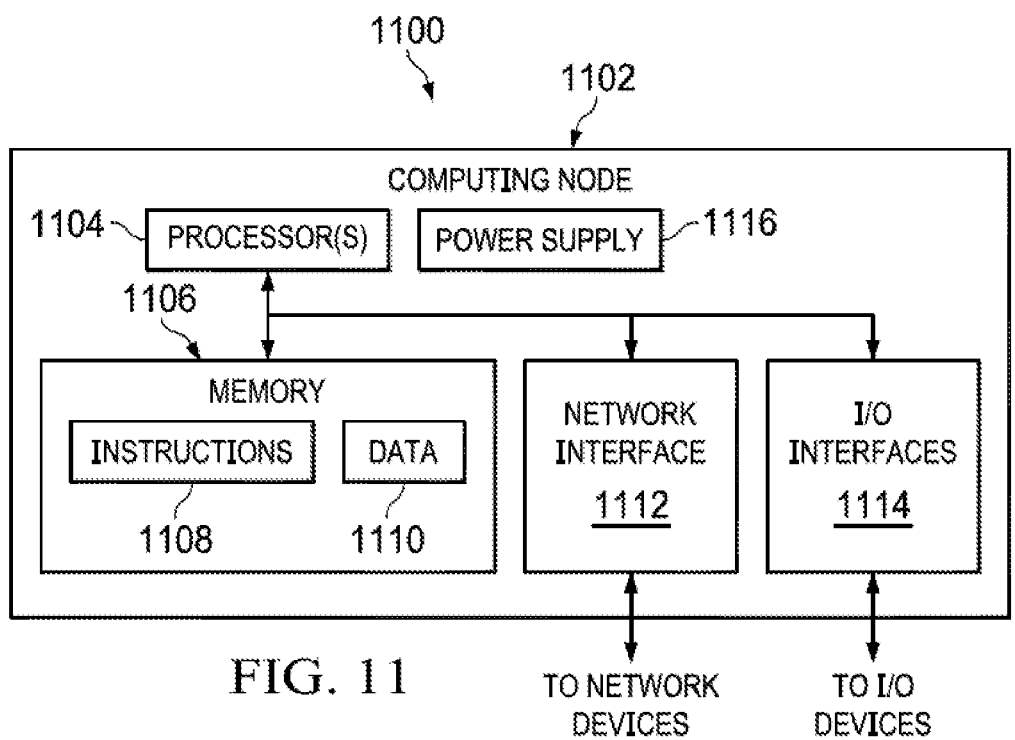
FIG. 11 shows a block diagram for a server system that includes a fixed-frequency enhanced voltage mode regulation circuit as described herein.

FIG. 11 shows a block diagram for a server system 1100 that includes a fixed-frequency enhanced voltage mode regulation circuit as described herein. The server system 1100 includes one or more computing nodes 1102. Each computing node 1102 includes one or more processors 1104 coupled to memory 1106, a network interface 1112, and one or more I/O interfaces 1114. In various embodiments, a computing node 1102 may be a uniprocessor system including one processor 1104, or a multiprocessor system including several processors 1104 (e.g., two, four, eight, or another suitable number). Processors 1104 may be any suitable processor capable of executing instructions. For example, in various embodiments, processors 1104 may be general-purpose or embedded microprocessors, graphics processing units (GPUs), digital signal processors (DSPs) implementing any of a variety of instruction set architectures (ISAs). In multiprocessor systems, each of the processors 1104 may commonly, but not necessarily, implement the same ISA.

The memory 1106 may include a non-transitory, computer-readable storage medium configured to store program instructions and/or data accessible by processor(s) 1104. The memory 1106 may be implemented using any suitable memory technology, such as static random-access memory (SRAM), synchronous dynamic RAM (SDRAM), nonvolatile/Flash-type memory, or any other type of memory.

The server system 1100 may also include secondary storage, which may be implemented using volatile or non-volatile storage and storage devices for storing information such as program instructions and/or data. The secondary storage may include various types of computer-readable media accessible by the computing node 1102. A computer-readable medium may include storage media or memory media such as semiconductor storage, magnetic or optical media, e.g., disk or CD/DVD-ROM, or other storage technologies.

The network interface 1112 includes circuitry configured to allow data to be exchanged between computing node 1102 and/or other devices coupled to a network. For example, the network interface 1112 may be configured to allow data to be exchanged between a first instance of the server system 1100 and a second instance of the server system 1100. The network interface 1112 may support communication via wired or wireless data networks.

The I/O interfaces 1114 allow the computing node 1102 to communicate with devices external to the server system 1100. Devices coupled to the server system 1100 via the I/O interfaces 1114 may include one or more display terminals, keyboards, keypads, touchpads, scanning devices, voice or optical recognition devices, or any other devices suitable for entering or retrieving data by the computing node 1102. Multiple input/output devices may be present in a computing system 800.

The power supply 1116 generates the voltages that power the various components of the computing node 1102. For example, the power supply 1116 may provide power to the processor(s) 1104, the memory 1106, or any other components of the computing node 1102. The power supply 1116 includes an implementation of the fixed-frequency enhanced voltage mode regulation circuit 700 to generate one or more of the voltages that power the computing node 1102. Because the compensation circuit 714 allows for a reduction in the size of the inductors and output filter capacitors used in the power supply 1116, the size and cost of the computing node 1102 may be reduced. In the fixed-frequency enhanced voltage mode regulation circuit 700, duty cycle feedforward provides fast response to changes in load current, and discontinuous mode operation increases power efficiency of the power supply 1116.

The fixed-frequency enhanced voltage mode regulation circuit 700 provides a number of advantages over the fixed-frequency voltage mode regulation circuit 100. The compensation circuit 714 provides a gain and phase boost that allows for an increase in the size ranges of the inductor 706 and the output capacitor, which allow for use of a smaller, less costly inductor. Duty cycle feedforward provided by the replica transistors 722 and 724 synthesizes the output voltage of the fixed-frequency enhanced voltage mode regulation circuit 700 plus output voltage drop which improves the response of the fixed-frequency enhanced voltage mode regulation circuit 700 to increased load current. The switches 728 and 730 allow the fixed-frequency enhanced voltage mode regulation circuit 700 to provide discontinuous mode operation.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

Modifications are possible in the described embodiments, and other embodiments are possible, within the scope of the claims.

What is claimed is:

1. A process of operating a fixed-frequency enhanced voltage mode regulation circuit comprising:
   operating output transistors in a continuous conduction mode by comparing in a comparator a reference signal, a ramp signal, and a first feedback signal, the first feedback signal being coupled to a high-side output transistor and a low-side output transistor;
   operating the output transistors in a discontinuous mode by comparing in the comparator the reference signal and a second feedback signal, the second feedback signal being coupled to a replica high-side output transistor and a replica low-side output transistor; and
   switching between the continuous conduction mode and the discontinuous mode in response to current drawn through the low-side output transistor being lower than a threshold.

2. The process of claim 1 in which the switching includes disconnecting the ramp signal from one input of the comparator and connecting the second feedback signal to the one input of the comparator.

3. The process of claim 1 in which the switching includes:
   closing a first switch and opening a second switch in the continuous conduction mode; and
   opening the first switch and closing the second switch in the discontinuous mode.

4. The process of claim 3 including:
   closing the first switch and opening the second switch in response to a latch signal of one state; and
   opening the first switch and closing the second switch in response to a latch signal of another state.

5. The process of claim 1 in which the switching includes setting a latch signal in one state corresponding to the continuous conduction mode in response to an output of the comparator.

6. The process of claim 1 in which the switching includes setting a latch signal in another state corresponding to the discontinuous mode in response to sensing a current lower than the threshold through the low-side output transistor.

7. The process of claim 1 in which:
   the switching includes setting a latch signal in one state corresponding to the continuous conduction mode in response to an output of the comparator; and
   the switching includes setting the latch signal in another state corresponding to the discontinuous mode in response to sensing a current lower than the threshold through the low-side output transistor.

8. The process of claim 1 including coupling an output of the comparator to gates of the output transistors.

9. The process of claim 1 including coupling an output of the comparator to gates of the replica high-side and low-side output transistors.

10. The process of claim 1 in which the:
    operating output transistors in a continuous conduction mode includes coupling a switching point between the high-side output transistor and the low-side output transistor to the first feedback signal; and
    operating the output transistors in a discontinuous mode includes coupling a switching point between the high-side replica output transistor and the replica low-side output transistor to the second feedback signal.

11. The process of claim 1 in which the switching between the continuous conduction mode and the discontinuous mode includes sensing current drawn through a source of the low-side output transistor and switching signals applied to the comparator and driving gates of the high-side output transistor and the low-side output transistor from an output of the comparator output in response to the sensing.

12. The process of claim 1 including sensing a current drawn through the low-side output transistor being lower than a threshold to indicate a high impedance load coupled to the low-side output transistor.

13. The process of claim 1 including coupling a load to the high-side and low-side output transistors.

14. The process of claim 1 including coupling a load to the high-side and low-side output transistors through an inductor.

15. The process of claim 1 including providing the reference signal from a compensation circuit that boosts both phase and gain of the reference signal.

\* \* \* \* \*